(12) United States Patent
Gordon et al.

(10) Patent No.: US 11,232,880 B2
(45) Date of Patent: Jan. 25, 2022

(54) LATTICE ENERGY CONVERSION DEVICE

(71) Applicants: Frank E Gordon, San Diego, CA (US); Harper John Whitehouse, San Diego, CA (US)

(72) Inventors: Frank E Gordon, San Diego, CA (US); Harper John Whitehouse, San Diego, CA (US)

(73) Assignee: Inovi, Inc., San Diego, CA (US)

( * ) Notice: Subject to any disclaimer, the term of this patent is extended or adjusted under 35 U.S.C. 154(b) by 0 days.

(21) Appl. No.: 17/334,562

(22) Filed: May 28, 2021

(65) Prior Publication Data

US 2021/0398767 A1 Dec. 23, 2021

Related U.S. Application Data

(60) Provisional application No. 63/041,722, filed on Jun. 19, 2020.

(51) Int. Cl.
  *G21H 1/08* (2006.01)
  *H02N 3/00* (2006.01)
  (Continued)

(52) U.S. Cl.
  CPC .......... *G21H 1/08* (2013.01); *G21H 3/00* (2013.01); *G21K 5/00* (2013.01); *H01J 61/00* (2013.01);
  (Continued)

(58) Field of Classification Search
  CPC .. G21H 1/08; G21H 3/00; H02N 3/00; G21K 5/00; H01M 4/00; H01M 4/24;
  (Continued)

(56) References Cited

U.S. PATENT DOCUMENTS 1,217,739 A * 2/1917 Flannery ............... H01M 14/00
  429/5
2,517,120 A * 8/1950 Linder ................... H02M 11/00
  310/304

(Continued)

FOREIGN PATENT DOCUMENTS

WO WO-2014121121 A1 * 8/2014 ............... C25B 1/55

*Primary Examiner* — Edgardo San Martin
(74) *Attorney, Agent, or Firm* — Morland C. Fischer

(57) ABSTRACT

A lattice energy converter (LEC) is disclosed that produces ionizing radiation and/or electricity based on the thermal energy in the lattice of a specially prepared working electrode comprised in whole or in part of hydrogen host materials that are occluded with hydrogen or the isotopes of hydrogen and wherein the hydrogen host materials may include vacancies, superabundant vacancies, and other lattice defects. When the hydrogen host material is occluded with hydrogen, the LEC was found to self-initiate the production of ionizing radiation and, when the hydrogen host materials are in fluidic contact with a gas or vapor containing hydrogen or isotopes of hydrogen, the LEC was found to self-sustain the production of ionizing radiation. When the LEC includes one or more additional electrodes or electrode structures, the ionizing radiation was found to be converted to electrical energy. Materials that are normally considered to be radioactive are not required.

20 Claims, 19 Drawing Sheets

(51) Int. Cl.
*H01M 4/24* (2006.01)
*H01J 61/12* (2006.01)
*G21K 5/00* (2006.01)
*H01J 61/00* (2006.01)
*H01M 4/00* (2006.01)
*H01M 6/00* (2006.01)
*G21H 3/00* (2006.01)
*G21K 5/02* (2006.01)

(52) U.S. Cl.
CPC .............. *H01M 4/00* (2013.01); *H01M 4/242* (2013.01); *H01M 6/00* (2013.01); *H02N 3/00* (2013.01); *G21K 5/02* (2013.01); *G21K 2207/00* (2013.01)

(58) Field of Classification Search
CPC .......... H01M 4/242; H01M 6/00; H01J 61/06; H01J 61/12; H01J 61/28; H01J 61/36; H01J 61/42; H01J 61/52; H01J 61/526
See application file for complete search history.

(56) References Cited

U.S. PATENT DOCUMENTS

| | | | | |
|---|---|---|---|---|
| 2,696,564 | A * | 12/1954 | Ohmart | G01T 3/006 250/389 |
| 5,087,533 | A * | 2/1992 | Brown | H01M 14/00 429/5 |
| 8,419,919 | B1 | 4/2013 | Boss et al. | |
| 9,472,812 | B2 | 10/2016 | Keene et al. | |
| 9,865,789 | B2 * | 1/2018 | Geballe | H01J 45/00 |
| 10,841,989 | B2 | 11/2020 | Gordon et al. | |
| 2009/0148731 | A1 * | 6/2009 | Mills | H01M 8/04216 429/421 |
| 2011/0148248 | A1 * | 6/2011 | Landa | H01J 45/00 310/306 |
| 2015/0155127 | A1 * | 6/2015 | Fink | H05H 3/06 250/427 |
| 2016/0244889 | A1 * | 8/2016 | Gordon | C25B 1/02 |

\* cited by examiner

LATTICE ENERGY CONVERSION DEVICE

CROSS-REFERENCE TO RELATED APPLICATIONS

This application claims the benefit of U.S. Provisional Patent Application No. 63/041,722, filed Jun. 19, 2020, entitled "DIRECT LATTICE ENERGY CONVERSION DEVICE," the content of which is fully incorporated by reference herein.

BACKGROUND OF THE INVENTION

1. Field of the Invention

This invention relates to a lattice energy conversion (LEC) device that was found to be capable of self-sustaining the conversion of energy in a lattice structure of some specially prepared materials or of materials within the lattice structure into ionizing radiation and electrical energy without requiring the use of materials that are considered to be naturally radioactive.

2. Background Art

There is a long recognized need for a MEANS and method to produce reliable and continuous "green" or $CO_2$ emission free electrical energy that does not involve the burning of fossil fuels as well as other carbon based materials. Some approaches include nuclear, hydroelectric, geothermal, photovoltaic, and wind farms. However, each of these options has its own drawbacks. In particular, nuclear power requires the use of radioactive materials and produces hazardous radioactive waste. Hydroelectric and geothermal are limited to specific locations. Photovoltaic systems, without a means of energy storage, only supply power when the sun is shining. Wind farms, without a means of energy storage, only supply power when the wind is blowing and are known to create low frequency noise and be hazardous to birds.

Known devices that convert thermal energy into electrical energy without using radioactive materials include thermoelectric generators (TEGs) that rely on the Seebeck effect or thermopiles that employ multiple thermocouples and thermionic converters that use thermionic electron emission in a vacuum where the temperature of the electron emitter may be as high as 700° C. or greater. Such devices require a temperature difference between a heat source and a heat sink. In general, these thermal to electrical energy devices only produce a small amount of electrical energy which has limited their applications.

Some methods for direct energy conversion involve the use of radioactive materials. One approach is the Direct Charge method wherein the particles or ions emitted by radioactive decay transport their charge to an electrode which may be comprised of a simple metallic electrode or solid state energy conversion devices such as alpha voltaic or beta voltaic devices. This atomic Direct Charge method operates primarily as a current source. A second approach is the contact potential difference (CPD) method which utilizes the ions emitted by radioactive materials to ionize a gas wherein the gaseous ions are collected by electrodes or electrode structures which may be comprised of materials of different electrochemical properties or work functions. Although these two approaches have been known for nearly 100 years, their use has been limited in part due to the requirement for radioactive materials and the small amount of energy produced.

The metal-hydrogen (M-H) system, Fukai (The Metal-Hydrogen System Second Edition, Y. Fukai, Springer Series in Materials Science, 2005), and the palladium-hydrogen (Pd—H) system Lewis, (The palladium-hydrogen system, 1967 Academic Press) have been studied for more than 150 years. In 1863, Sainte-Claire Deville and L. Troost reported that hydrogen diffused rapidly through homogeneous plates of fused iron and platinum. These surprising results led Thomas Graham, Master of the Royal Mint, to conduct a similar series of experiments with palladium. Three years later, in 1866, Graham was the first to report the high rate at which hydrogen would diffuse through heated palladium. In 1958, Darling (Platinum Metals Rev., 1958, 2, (1), 16 "The Diffusion of Hydrogen through Palladium" A. S. Darling, Ph.D., A. M. I. Mech. E.) reported that the permeability of hydrogen in Pd is greatly increased if the hydrogen gas is flowing, rather than static, over the surface of Pd. In his book on page 225, Fukai points out the importance of vacancies including super-abundant vacancies that are formed in the process of "electrodeposition of metals from aqueous solutions."

Likewise, the ionization of gases by ionizing radiation and the resulting conduction of electricity by the ionized gas is a complicated phenomenon that has been studied since the latter part of the $19^{th}$ century. J. J. Thomson and E. Rutherford published some of their original work in 1896 titled "The passage of Electricity through Gases exposed to Röntgen Rays" Phil. Mag. S, 5, 42 (1896). A definitive publication that describes the conduction of electricity by gases over a wide range of pressures and temperatures is the two volume 3P Edition treatise by Noble laureates Sir J. J. Thomson, (physics 1906) and his son G. P. Thomson (physics 1937) entitled Conduction of Electricity Through Gases, 3P Edition, Volume 1 1928, Volume 11, 1933. K. K. Darrow (Electrical Phenomena in Gases, 1932 Williams & Wilkins Company) discussed the importance of the diffusion of ions to the measurement of the current density per unit area. This research forms the basis to analyze the performance of a lattice energy conversion device with the objective of both understanding the phenomenon and of optimizing its performance in order to realize a practical application.

The Lattice Energy Conversion device or Lattice Energy Converter (LEC) cell described below builds on the knowledge of the metal hydrogen system involving hydrogen host metals such as iron, nickel, and palladium, and the knowledge of the conduction of electricity through a gas to produce a new and novel energy conversion device that produces ionizing radiation which results in the production of ions and electrical energy. Such a LEC cell offers the potential to meet the need for reliable continuous "green" or $CO_2$ emission free electrical energy that does not involve the burning of fossil fuels as well as other carbon based materials. Moreover, a LEC cell does not require the use of naturally radioactive materials. The LEC embodiments include self-initiating and self-sustaining devices that convert the energy in a specially prepared hydrogen host material lattice that contains or is occluded by atoms of hydrogen or deuterium into ionizing radiation and electrical energy. Additionally, LEC embodiments operate over a wide range of temperatures without the requirement of a supply of external electrical energy and wherein the flux of ionizing radiation and the resulting ionization of the gas increase with temperature.

U.S. Pat. No. 9,472,812 issued Oct. 18, 2016 describes "an electron collector located within said interior volume and proximate to said ionizing material for receiving electrons from said ionizing material;" and "an insulator material located within said interior volume positioned between said ionizing material and said ion collector" where the "Insulator=Non-electrically conductive materials positioned between the anode and cathode to prevent electrons from flowing therebetween while preferably allowing the gas or ionized gas within the cell to pass from (through and/or around the insulator) the anode to the cathode; . . . ." Nevertheless, there are several significant differences between the patented Electric Energy Cell referred to above and the lattice energy conversion (LEC) device implementations of our invention, wherein ionizing radiation is produced and converted into electricity without the requirement for layers of semi-conductor and/or insulating materials between the ionizing material or the inclusion of materials to prevent electrons from flowing while allowing the ionized gas to pass. In addition, the LEC cells described below have demonstrated the ability to produce ionizing radiation even when the working electrode is not part of a physical electrical circuit such as a wire.

U.S. Pat. No. 10,841,989 issued Nov. 17, 2020 describes a "GASEOUS-PHASE IONIZING RADIATION GENERATOR" for the " . . . generation of ionizing radiation in an electrically controllable manner . . . ." Our invention is an improvement of the patented Gaseous-Phase Ionizing Radiation Generator referred to above in that the LEC cells disclosed below have demonstrated the capability to self-initiate and self-sustain the production of ionizing radiation and the production of electrical potential and current in the absence of an external source of electrical potential or current.

SUMMARY OF THE INVENTION

Disclosed herein are Lattice Energy Converter (LEC) cells that convert energy such as the thermal and/or the vibrational energy as well as other energy in a lattice structure, or of the material contained within the lattice structure of one or more working electrodes, into other forms of energy such as ionizing radiation and/or electricity without the requirement to use naturally radioactive materials. The "active" element of a LEC device consists of one or more working electrodes comprised in whole or in part of specially prepared hydrogen host material from the metal hydrogen system such as iron, nickel, and palladium. When the lattice structure of the hydrogen host material is occluded with hydrogen, the LEC cell will self-initiate the production of ionizing radiation. When the specially prepared hydrogen host material is in fluidic contact with a gas or vapor comprised in whole or in part of hydrogen, the hydrogen in the gas will diffuse into, be occluded, and diffuse out or be ejected out of the lattice structure of the hydrogen host material so as to cause the LEC cell to self-initiate and self-sustain the production of ionizing radiation. By including one or more counter electrodes or electrode structures in addition to an active working electrode, the ionizing radiation or the ions thereby produced by the LEC cell can be collected as electrical energy.

DEFINITIONS

Figure 1:
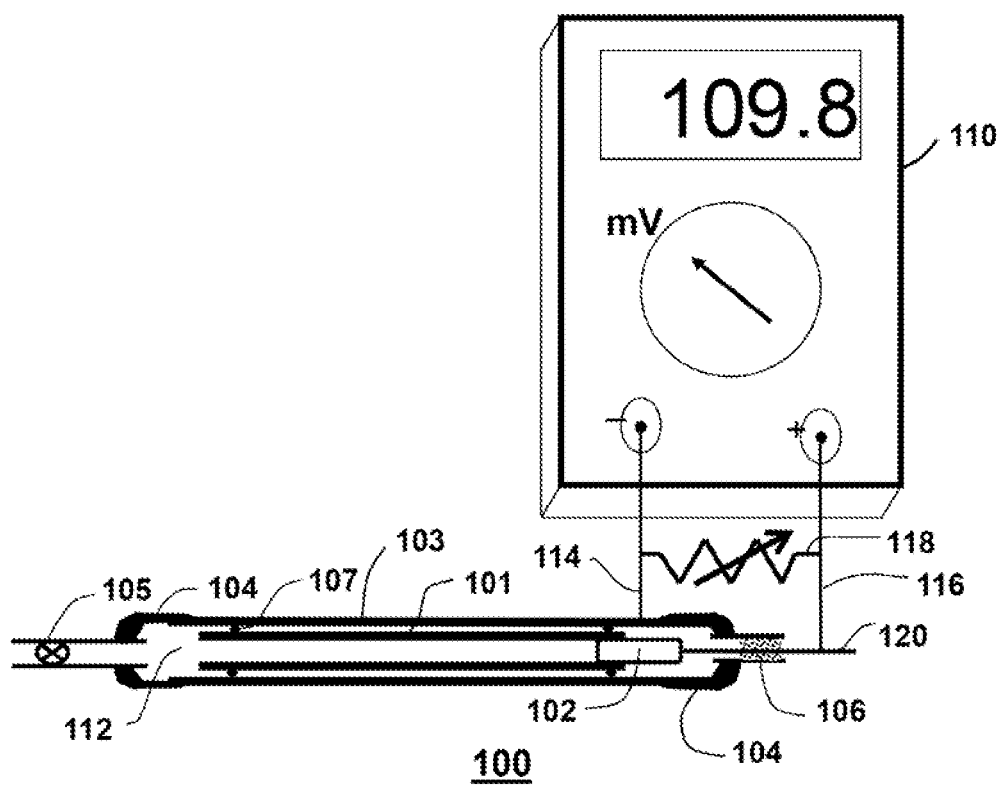
FIG. 1 illustrates a preferred embodiment for a Lattice Energy Converter (LEC) cell with a digital volt meter (DVM) to measure the electrical performance of the cell.

For purposes of the disclosure below, in addition to standard scientific definitions, the following definitions also apply.

Active material or active electrode: An electrode comprised of materials, that are not required to be naturally radioactive, that spontaneously produces and/or emits one or more forms of electromagnetic and/or particulate ionizing radiation when it is occluded with hydrogen. An active material or electrode may be comprised of nanoparticles or microparticles, clusters of nanoparticles or microparticles, deposited materials or bulk materials that are occluded with hydrogen or isotopes of hydrogen wherein the energy of the lattice structure in combination with the hydrogen or deuterium that is occluded in the lattice structure of the hydrogen host material leads to the production of ionizing radiation. The active material or hydrogen host material of the working electrode may be physically connected to other electrodes such as with a wire or as part of a physical electric circuit or it may be connected to the other electrodes only by the ionizing radiation and/or the ions in the gas.

Cell: Unless otherwise defined, a "cell" refers to a Lattice Energy Conversion (LEC) device and/or its physical implementations.

Cell current: Cell current, $I_{Cell}$ or $I_{LEC}$ is the totality of the currents produced by the flux of cell radiation during its operation and is comprised of a radiation current $I_{Radiation}$, an internal shunt current $I_{Shunt}$, and an external load current $I_{Load}$, where $I_{Radiation}=I_{Shunt}+I_{Load}$ Contact potential, contact potential difference (CPD), or Volta potential: Contact potential difference or Volta potential is the voltage difference in work functions between different materials or different surface conditions. Contact potential also refers to a device wherein positive and negative gaseous ions preferentially migrate to electrodes comprised of materials of different work functions.

Counter electrodes: Counter electrodes may form a pair with other counter electrodes or with the working electrode to intercept or collect the charge from the ionizing radiation as well as the gas ions. A LEC device may contain multiple counter electrodes that may include materials with different work functions. Counter electrodes may also participate in the production of ionizing radiation via the photoelectric effect wherein electromagnetic radiation from the working electrode causes energetic electrons to be ejected from the counter electrode which may also ionize the gas. A counter electrode may be a solid material such as a sheet or rod or it may be a screen or a grid of wires. Counter electrodes also may be comprised of voltaic devices or other devices that produce electricity when interacting with particles, ions, or electromagnetic radiation.

Electrode structure: An electrode or combination of electrodes that may be electrically interconnected and may include perforations, apertures, or open areas such as but not limited to a mesh, screen, comb, grid, or perforated plates for the passage of a gas and/or radiation.

Fluidic contact: As used herein, fluidic contact includes contact between an electrode and a gas including molecules, atoms, or ions contained within the gas. If the gas contains hydrogen, it will diffuse into, be occluded, and diffuse out or be ejected out of the hydrogen host material.

Flux: The rate of flow of a fluid or gas, radiant or ionizing energy, or particles across a given area.

Hydrogen: As used herein, hydrogen includes hydrogen gas, its atoms, and ions as well as the isotopes and ions thereof such as deuterium and deuterium ions.

Hydrogen host materials: Hydrogen host materials include materials and alloys of materials that may form a metal hydride when they are in fluidic contact with a gas containing hydrogen by well-established processes known as diffusion, loading, charging, or hydrogenation of hydrogen into the hydrogen host material wherein the hydrogen is occluded interstitially within the lattice structure of the hydrogen host material, within vacancies, within super-abundant vacancies, intergranularly, or within crystal dislocations, defects, and cracks. Hydrogen also will diffuse, deload or dehydrogenate out of the hydrogen host material. ("Molecular Dynamics Studies of Fundamental Bulk Properties of Palladium Hydrides for Hydrogen Storage," X. W. Zhou et. al. Journal of Physical Chemistry C, Oct. 18, 2016). A few examples of hydrogen host materials include iron, palladium, nickel, titanium and alloys and combinations of these materials and others such as PdAg and NiTiNOL (NiTi). Hydrogen host materials may also include materials into which hydrogen diffuses but does not form a metal hydride at normal temperatures and pressures. ("Diffusion in Solids, Fundamentals, Methods, Materials, Diffusion-Controlled Processes," H. Mehrer, 2007). Hydrogen host materials may include bulk and/or deposited materials, sponge-like forms such as iron sponge, palladium black and nickel black, as well as nanoparticles and microparticles and clusters of nanoparticles and microparticles of hydrogen host materials. The use of the term specially prepared hydrogen host materials includes materials with lattice features such as vacancies, super-abundant vacancies, cracks and other material defects and wherein the hydrogen host material is occluded with hydrogen such that it is capable of producing ionizing radiation.

Ion-Ion plasma: In ion-ion plasmas, negative ions replace electrons as the primary negative charge carriers. In the absence of a significant number of electrons, ion-ion plasmas may behave quite differently compared to conventional electron-ion plasmas. An ion-ion plasma may be produced by energetic electrons passing through the gas.

Ionizing radiation: Ionizing radiation includes radiation that has sufficient energy to produce ions by detaching electrons from atoms or molecules, thereby ionizing them. Ionizing radiation may include energetic subatomic particles, energetic electrons, ions, or atoms and electromagnetic radiation such as UV, gamma and x-rays or Rttntgen rays.

Vapor: A vapor includes a fluid that may be a gas, a mixture of gases and/or a mixture of two phases such as a gas and a liquid.

Voltaic device: A voltaic device is composed of materials that produce an electrical current or potential in an external circuit when impacted by ions or particles or illuminated by electromagnetic waves. Examples include alphavoltaic, betavoltaic, and photovoltaic devices.

Work Function: "The electron work function $\Phi$ is a measure of the minimum energy to extract an electron from the surface of a solid" e.g., $\Phi$: Pd polycr(yastal) 5.22 eV, Zn polyer 3.63 eV (https://public.wsu.edu/~pchemlab/documents/Work-functionvalues.pdf.). The work function of a material may change due to changes at the surface of the material such as those caused by oxidation and the interaction of ionizing radiation or ions with the surface.

Working electrode or material: As used herein, the term "working electrode" or "specially prepared working electrode" refers to the electrode as well as the hydrogen host material that converts the energy in the lattice and/or the energy in the material occluded within the lattice of the hydrogen host material into spontaneous ionizing radiation. The specially prepared working electrode or material is comprised in whole or in part of hydrogen host material with a lattice structure that may include one or more of vacancies, super-abundant vacancies and defects or cracks, and is occluded with hydrogen or deuterium. The working electrode may be composites or alloys of materials including hydrogen host materials where the atomic hydrogen atoms are occluded, stored, modified, ejected, or consumed. The working electrode or material may be comprised of individual small particles such as nanoparticles or microparticles, groups, clusters of or assemblies of particles such as palladium black, palladium sponge, bulk palladium, iron sponge, or electrodeposited or codeposited iron from an aqueous solution of $FeCl_2$. A working electrode or material becomes "active" when it is producing one or more forms of ionizing radiation. The working electrode or material may be either the anode or cathode of an electrical circuit depending on the direction of the flow of the electrons or neither the anode nor the cathode of an electrical circuit and does not need to be physically connected, such as by a wire, to other components of an electrical circuit.

Lattice Energy Converter (LEC): An energy conversion device that converts energy such as the thermal and/or vibrational energy as well as other energy in the lattice or of the material contained within the lattice of one or more working electrodes into other forms of energy such as ionizing radiation and/or energetic ions without requiring materials that are naturally radioactive. The "active" element of a LEC device consists of one or more working electrodes comprised in whole or in part of specially prepared hydrogen host material such as but not limited to palladium or alloys of palladium that are occluded with hydrogen or deuterium and wherein vacancies, including superabundant vacancies and other defects such as those that are produced during codeposition of palladium from an aqueous solution, those produced by continuous and prolonged electrolysis, and those produced by heating and cooling the hydrogen host material.

As it relates to this invention, when the lattice structure of a specially prepared hydrogen host material is occluded with hydrogen, one or more forms of ionizing radiation are produced wherein the ionizing radiation has sufficient energy to transport a charge and/or ionize a gas that is in fluidic contact with the hydrogen host material. When the specially prepared hydrogen host material is in fluidic contact with a gas or vapor comprised in whole or in part of hydrogen, the LEC device will self-initiate and self-sustain the production of ionizing radiation. Experimental results have shown that the specially prepared hydrogen host material that is in fluidic contact with air which has less than one part per million of hydrogen is sufficient to produce measurable ionizing radiation at normal room temperatures.

In addition to the active working electrode or electrodes, a LEC device may include one or more additional counter electrodes or electrode structures comprised of materials such as voltaic devices or materials to collect the radiation flux or the ions that are produced. Counter electrodes also may participate in the production of ionizing radiation via the photoelectric effect wherein electromagnetic radiation from the working electrode causes energetic electrons to be ejected from the counter electrode and these electrons can contribute to the ionization of the gas. Additionally, counter electrodes or electrode structures may be comprised of materials with different electrical properties or work functions that will preferentially collect the ionized gas ions between the electrodes or between the electrodes and ground in order to produce a voltage between the electrodes or a current in an external load connected between the electrodes. For some applications, a LEC device also may require a means to confine and maintain the gas or vapor in fluidic contact with the hydrogen host material such as a sealable vessel wherein the vessel may have ports and valves to inject and control the pressure of the gas or vapor to control the flux of ionizing radiation and electrical feedthroughs for the passage of electrical signals into and out of the vessel.

A LEC device has multiple implementations and applications for the ionizing radiation such as but not limited to medical applications, sterilization of surfaces and foods, space propulsion, and the production of electricity. Analysis of experimental results indicates that in some embodiments, the LEC is operating like a current source. This is similar to the Direct Charge effect in nuclear batteries wherein radioactive decay such as energetic alpha or beta particles that transport charge to a receiving electrode. Experimental results also indicate that the gas ions produced by the ionizing radiation will preferentially drift under the influence of an electric field such as that which may be produced by different work functions or diffuse under the influence of a concentration gradient and deposit their charge on electrodes comprised of materials with different work function where they will produce a voltage between the electrodes and a current through a load impedance that is connected between the electrodes. A unique feature of the LEC disclosed herein is that it produces a wide range of experimental results without the requirement for materials that are naturally radioactive.

Several LEC embodiments have been constructed and tested including: the use of a gas or vapor comprised of air which contains a small amount of hydrogen and gases or vapors comprised primarily of hydrogen or deuterium gas; the use of gas pressures between approximately 500 Torr and 3 bar; the use of different hydrogen host lattice materials; changes in the preparation of the hydrogen host lattice structure to include vacancies and other defects; changes to cell dimensions and geometries such as cylindrical, flat plate, and other configurations; increased or reduced separation distance between the electrodes, as well as additional electrodes and electrode structures comprised of materials such as copper and zinc which have different electrical properties or work functions. LEC embodiments have been demonstrated wherein the active working electrode is physically connected such as with a wire through a resistive load impedance to the counter electrodes.

Other LEC embodiments will be explained wherein the active hydrogen host material of the working electrode is not physically connected, for example without a wire, to the electrical load or to the other electrodes and only needs to be in fluidic contact with the gas or vapor containing hydrogen to produce self-sustained ionizing radiation. Analysis of experimental results further indicate that some LEC device embodiments behave primarily as a current source while other LEC device embodiments behave primarily as a voltage source. In both cases, experimental evidence indicates that the flux of ionizing radiation increases with the temperature of the LEC device and its hydrogen host material. Experimental analysis also suggests that the flux of ionizing radiation and its conversion to electricity involves multiple physical and electrical phenomena including some concurrently competing phenomena. These effects will be more fully illustrated and described when referring to the drawings.

Critical components of the LEC device include a specially prepared working electrode comprised in whole or in part of a hydrogen host material lattice structure that is occluded with hydrogen or deuterium and is in fluidic contact with a gas or vapor comprised in whole or in part of at least one of hydrogen, deuterium, their ions, or a combination thereof wherein the hydrogen or deuterium can diffuse into, be occluded and diffuse out of the hydrogen host material. In order to produce at least one of a voltage or a current, one or more counter electrodes may be required. For self-sustained production of ionizing radiation, a means or vessel to confine the gas or vapor in fluidic contact with the hydrogen host material may be required. For some embodiments, additional features may be included such as ports, valves, electrical feedthroughs, additional electrodes, or electrode structures, a heater or source of heat, as well as a source of magnetic field and other stimuli. As shown in the drawings, embodiments can also include a vessel comprised of electrodes that are separated by an electrically insulating material that also confines the gas in fluidic contact with the electrodes.

Multiple experiments have demonstrated the production of ionizing radiation. In the absence of a gas or vapor containing hydrogen or deuterium in fluidic contact with the hydrogen host material, the flux of the ionizing radiation appears to monotonically decay over a few days. In order to self-sustain the production of ionizing radiation, the hydrogen host material must be in fluidic contact with a gas or vapor wherein hydrogen or deuterium is available to diffuse into the hydrogen host material to maintain the production of ionizing radiation. One possible mechanism for the production of ionizing radiation to ionize the gas is that the working electrode may eject particles or ions that have a charge and sufficient energy to ionize the gas and, depending on cell geometry, can transport a charge to a counter electrode. Another mechanism for the production of ionizing radiation to ionize the gas occurs when the working electrode emits electromagnetic radiation such as gamma radiation and/or UV radiation that interacts with a counter electrode to produce energetic electrons via the photoelectric effect and the energetic electrons ionize the gas. Experimental evidence also indicates that the flux and/or energy of the ionizing radiation increases with temperature. Experimental evidence indicates that vacancies, super-abundant vacancies and other defects in the lattice structure of the hydrogen host material aid the production of ionizing radiation wherein lattice dynamics, which may include nonlinear effects, combine to produce the conditions required to produce ionizing radiation from the hydrogen host material.

Multiple protocols such as but not limited to the codeposition of both palladium and deuterium from an aqueous electrolyte comprised of palladium chloride and lithium chloride in a solution of $D_2O$ are described in U.S. Pat. No. 8,419,919. Another protocol that uses a solution of palladium chloride and lithium chloride in an aqueous solution of $H_2O$ to codeposit multiple layers of palladium and hydrogen is described in U.S. Pat. No. 10,841,989. This protocol has been used to conduct most of the experiments described herein. Experimental evidence also indicates that removing the electrode from the plating solution after several hours of codepositing Pd—H or Pd-D and allowing it to dry for several hours as well as heating the electrode to 350-450° C. for 10 to 30 minutes and cooling the electrode in the presence of normal atmosphere or hydrogen or deuterium gas as part of the preparation procedure may be beneficial. Another protocol to produce an active working electrode utilizing codeposition of iron from an aqueous solution of Ferrous Chloride, ($FeCl_2$-$4H_2O$) proved to be successful. Additional deposition protocols to prepare the hydrogen host materials such as but not limited to plasma discharge, ion implantation, and self-heating/cooling in gas by passing current have demonstrated the ability to produce ionizing radiation.

For the purpose of promoting an understanding of this invention, several embodiments are included in the drawings to demonstrate some of the functions, features, and implementations of the LEC as well as selected experimental data and supporting analysis. It is recognized that the ionizing radiation produced by a LEC device can be substituted for the ionizing radiation produced by radioactive materials in many applications such as the nuclear or atomic battery designs described by Ohmart in U.S. Pat. No. 2,696,564; Flannery in U.S. Pat. No. 1,217,739; Linder in U.S. Pat. No. 2,517,120; Brown in U.S. Pat. No. 5,087,533, and others. It will nevertheless be understood that no limitation of the scope of this invention is intended by the selected embodiments. Any alterations and further modifications in the described embodiments such as different working electrode alloys and hydrogen host materials, different electrode preparations such as sputtering and other deposition techniques as well as other metallurgical processes, different cell geometries and configurations, as well as any further applications of the concepts of the invention as described herein are contemplated as would normally occur to one skilled in the art to which the invention relates.

Referring now to the drawings, FIG. 1 illustrates a first experimental embodiment for a Lattice Energy Converter (LEC) cell 100. Components included in the LEC cell 100 are a gas or vapor 112 comprised in whole or in part of at least one of hydrogen or deuterium or a combination thereof, a specially prepared and active working electrode 101 comprised in part of a hydrogen host material, an outer counter electrode 103 comprised of a brass or galvanized pipe nipple in combination with bushings 104 at opposite ends of the counter electrode 103, a valve 105 and a gas tight electrically insulating epoxy 106 form a vessel to confine the gas or vapor 112. An electrical conductor 120 passes through the gas tight electrically insulating epoxy 106 to make electrical contact with the working electrode 101 via a threaded connection 102. The working electrode 101 is centered within the counter electrode 103 by loose fitting O-rings 107 at opposite ends of the working electrode 101 so as to prevent physical electrical contact between the inner working electrode 101 and the outer counter electrode 103 while also allowing the gas or vapor 112 to pass so as to maintain the gas or vapor in fluidic contact with the working electrode 101. After assembly, the LEC cell 100 is evacuated and refilled with hydrogen or deuterium gas at pressures from 500 Torr to 3 bar.

A digital volt meter (DVM) 110 with approximately 10 MΩ input impedance is connected by a conductor 114 to the counter electrode 103 and by conductors 116 and 120 to the working electrode 101 measured 109.8 mV that is spontaneously produced and self-sustaining between the electrodes 101 and 103 in the LEC cell 100 and wherein the voltage increased with increased temperature. A variable load impedance resistor 118 is connected in parallel with the DVM 110 to measure the LEC voltage and calculate the current output under various controlled load conditions. The LEC cell configuration of FIG. 1 also demonstrated the ability to produce a voltage and current in the presence of normal atmosphere which contains a small amount of hydrogen.

Not shown in FIG. 1 is an optional external source of heat such as solar radiation, waste or low grade heat to increase the thermal energy of the working electrode and thereby increase the flux of ionizing radiation. Also not shown is an optional magnet or source of magnetic field to influence the lattice dynamics of the working electrode and the properties of the occluded hydrogen such as its spin alignment and orientation. A magnetic field can also influence the motion of ions within a gas. It should be recognized that the addition of an electric field can influence both the occlusion of hydrogen and the motion of ionized particles and thereby alter the flux of ionizing radiation and the resulting voltage and current.

Typical dimensions for the LEC cell 100 shown in FIG. 1 are an inner working electrode 101 comprised of a ⅛ inch brass pipe nipple that is approximately 4 inches long which has been plated on its outer surface with a silver or nickel flash plating using a commercial plating solution followed by Palladium-hydrogen (Pd—H) codeposition from an aqueous solution of $PdCl_2$ and LiCl. The outside diameter (od) of the ⅛ inch pipe nipple is 1.028 cm resulting in a circumference of ~3.23 cm. Typically a ~8 to 9 cm length of the nipple is codeposited resulting in ~26 to 29 $cm^2$ of covered surface area. The outer counter electrode 103 is a ⅜ inch pipe nipple that is approximately 5 inches long with a ~1.26 cm inside diameter (id) which provides a separation distance between the inner and outer electrodes of approximately 1.1 mm. This separation distance was selected in order to minimize the recombination of the ions in the gas 112 between the electrodes 101 and 103. Tests were conducted using both brass and galvanized (zinc) pipe nipples, which have different work functions, for the outer electrode 103.

Experimental procedures include tests with the temperature being relatively constant and tests with the LEC cell 100 placed in a temperature controlled chamber to obtain data over a range of temperatures. Voltage is measured with the DVM 110 initially set on the millivolt scale so the instrument input resistance is ~1000 MΩ connected in parallel with the variable load resistor 118 connected between electrical instrumentation conductors 114 and 116 which are respectively connected to the outer electrode 103 and the wire 120 that is connected to the active working electrode 101. When the measured voltage drives the DVM into overload on the millivolt scale, the DVM is switched to the volt scale which has an input resistance of ~10 MΩ. Current flowing through the variable load resistor 118 is calculated using Ohm's law. DVM output is recorded by way of an optical coupling to a computer (not shown) with a sample rate of approximately 2 samples per second.

Figure 2:
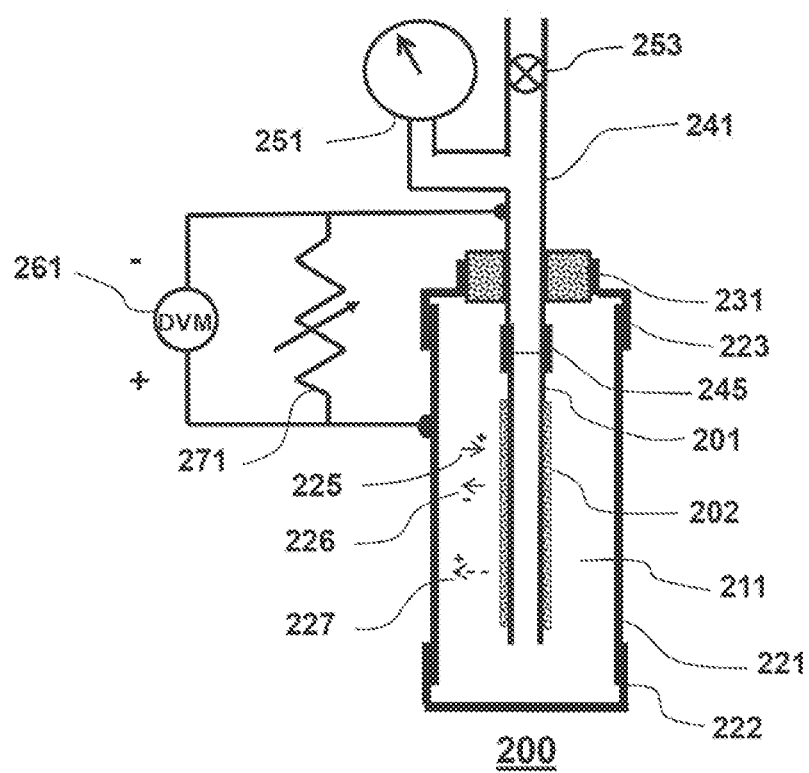
FIG. 2 illustrates an alternative embodiment for the LEC with a larger separation distance between the working and counter electrodes.

FIG. 2 shows an alternative experimental LEC cell embodiment 200 similar to that shown in FIG. 1. In this embodiment, the inner specially prepared working electrode with hydrogen host material 201 is comprised of a ¼ inch diameter Cu tube approximately 4 inch long that is plated on the outer surface with a silver or nickel flash followed by a codeposition of Pd—H hydrogen host material 202 from an aqueous solution. It is connected to a manifold 241 that includes a compound pressure gauge 251 and a valve 253 by a coupling 245. The working electrode 201 before codeposition has an outside diameter of 0.635 cm and a circumference of ~1.99 cm. Typically ~8-9 cm length of the Pd—H hydrogen host material 202 is codeposited, resulting in ~16-18 $cm^2$ of covered surface area. The vessel, also the counter electrode 221 is a ¾ inch by 5 inch long brass pipe nipple with a ~2 cm inside diameter. Tests also have been conducted wherein the outer electrode is a ¾ inch galvanized (zinc) pipe nipple which provides materials with a different work function than that of a brass nipple. Typical separation distance between the inner 201 and outer 221 electrodes is approximately 6 mm. The gas 211 is confined by the assembly comprised of the counter electrode 221, an end cap 222, a bushing 223, and nylon PTFE, or high temperature epoxy 231 to provide a pressure seal and electrically insulate the inner working electrode 201 and outer 221 electrodes. Ionizing radiation 227 is spontaneously emitted from the inner or active hydrogen host material 202 of the working electrode 201 that produces positive 225 and negative 226 gaseous ions in the gas 211 between the inner and outer electrodes 201 and 221.

Experimental procedures include tests with the temperature being relatively constant and tests with the cell placed in a temperature controlled chamber to obtain data over a range of temperatures. Voltage is measured across a variable load resistor 271 connected between the outer electrode 221 and the working electrode 201 via the manifold 241 and coupling 245, in parallel with a DVM 261 that is initially set on the millivolt scale so the instrument input resistance is ~1000 MΩ. When the measured voltage drives the DVM into overload on the millivolt scale, it is switched to the volt scale which has an input resistance of ~10 MΩ. Current through the variable load resistor 271 is calculated using Ohm's law. DVM output is recorded by way of an optical coupling with a sample rate of 2 samples per second.

Figure 3:
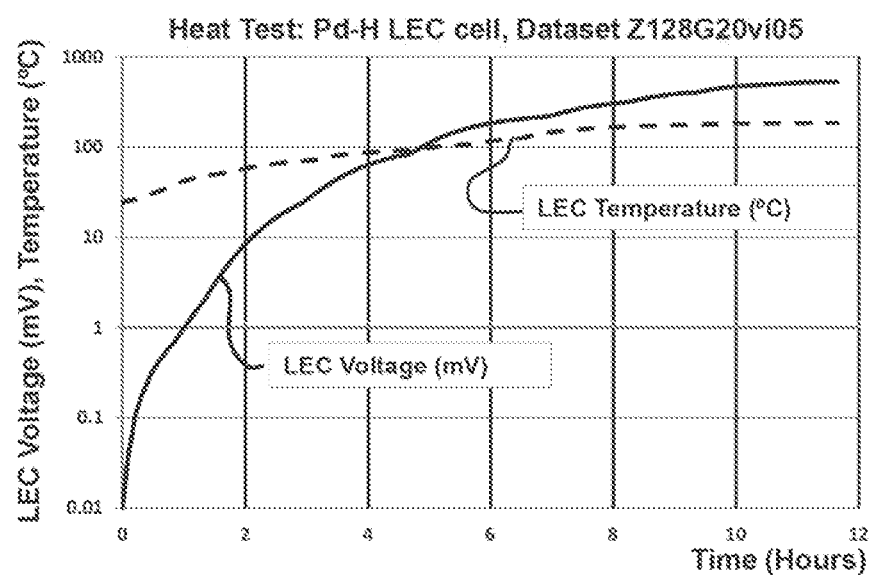
FIG. 3 displays typical LEC cell voltage and temperature measurements as a function of time as the cell is heated.

FIG. 3 shows plots of the spontaneous voltage and temperature as a LEC cell is being heated as a function of time. The plots indicate that the voltage increases approximately monotonically with temperature as the temperature is increased from approximately room temperature to 185° C. As shown, this LEC cell was only producing about 0.01 mV at room temperature and over 525 mV at 185° C.

Figure 4:
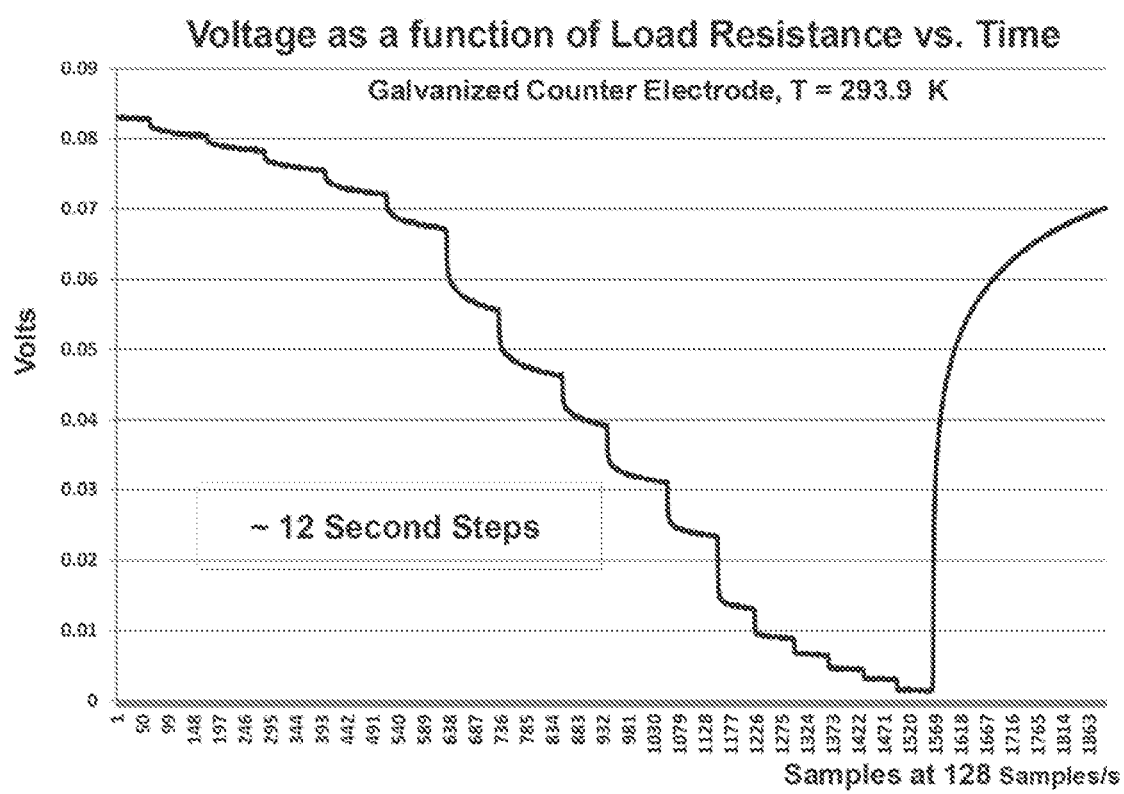
FIG. 4 displays typical LEC cell voltage as a function of load resistance versus time at a fixed temperature.

FIG. 4 shows the LEC voltage that is produced during a load test on a LEC cell with a working electrode comprised of a ⅛ inch by 4 inch long brass pipe nipple that was codeposited with palladium and a ⅜ inch by 5 inch galvanized pipe nipple outer or counter electrode when the variable load resistor is changed in ~20% steps from a high value of 1.0 Ml to a low value of ~220Ω. The time between steps is typically between 10 to 15 seconds in order to minimize atomic hydrogen ($^1H_1^+$) or atomic deuterium ($^2H_1^+$) deloading from the hydrogen host material of the working electrode. Some deloading of the occluded gas in the working electrode occurred as evidenced by the shape of the voltage rise-time required after the completion of the load test. The temperature during this test was constant at an ambient temperature of ~294 K. This data is used to characterize the performance of the LEC cell as shown in FIG. 5.

Figure 5:
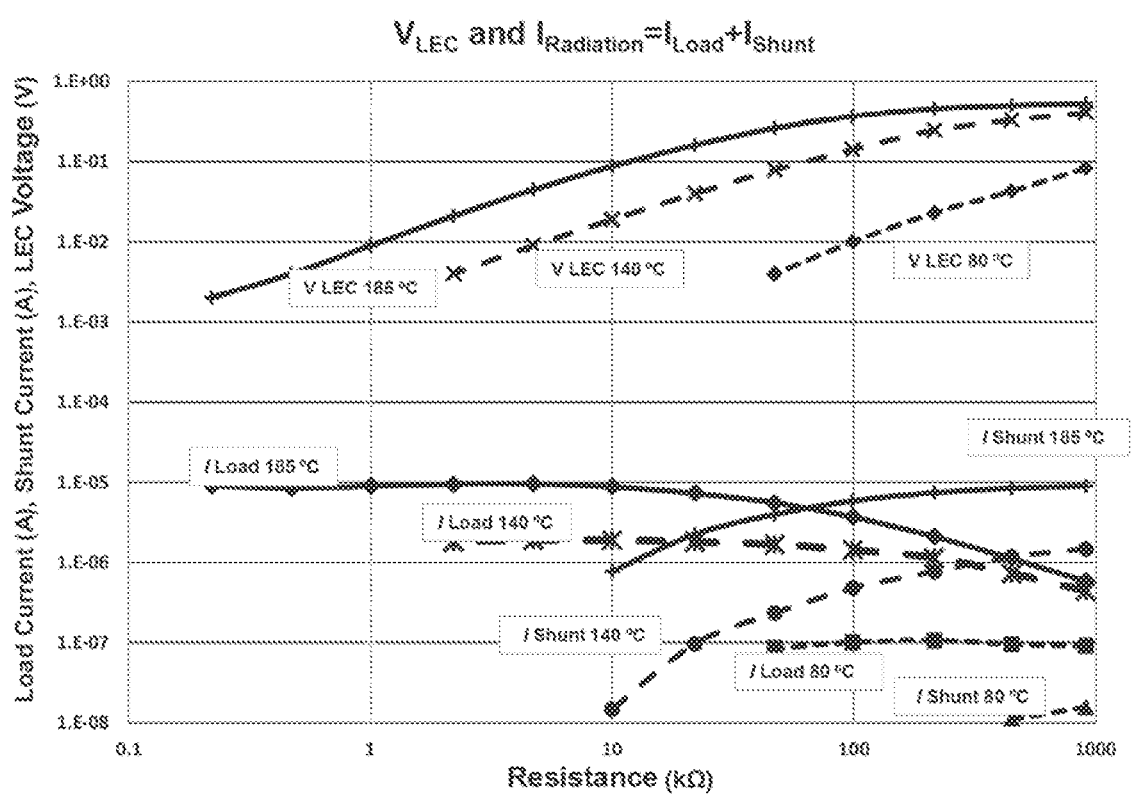
FIG. 5 shows plots of the LEC cell Voltage [V] versus Load Resistance [Ω] at three temperatures along with calculated properties of load current and internal shunt current for each temperature and resistance.

FIG. 5 shows a combined plot of measured LEC voltages and calculated currents through the load resistor as a function of load resistance at three different temperatures of 80° C., 140° C., and 185° C. with no external electrical energy being supplied to the cell. The upper traces plot the measured spontaneous LEC voltage versus resistance and the lower traces plot the calculated LEC load current and shunt current for the respective temperatures. LEC load current is calculated using Ohm's law. For low values of load resistance, the voltage increases in proportion to the increase in load resistance resulting in approximately constant current as plotted.

Such behavior is indicative that the LEC cell is operating as a constant current source, which may also indicate the presence of diffusing ions and/or particulate radiation flux. This constant current behavior is also shown in the lower or current traces for low values of load resistance. At higher values of the load resistance, LEC cell voltage is no longer proportional to load resistance. This is shown in the load current traces as a decrease in load current for higher values of the load resistance and an increase in the internal shunt current. It may be noted that the reduction in load current is greatest for the higher temperatures where the LEC voltage is greater. This behavior is characteristic of a shunt impedance internal to the cell. The shunt current reduces the current available to the external load resistance. The value of the shunt conductance, (G=1/R) and thus the shunt cell current is a function of LEC cell voltage, wherein $I_{Radiation} = I_{Load} + I_{Shunt}$.

Figure 6:
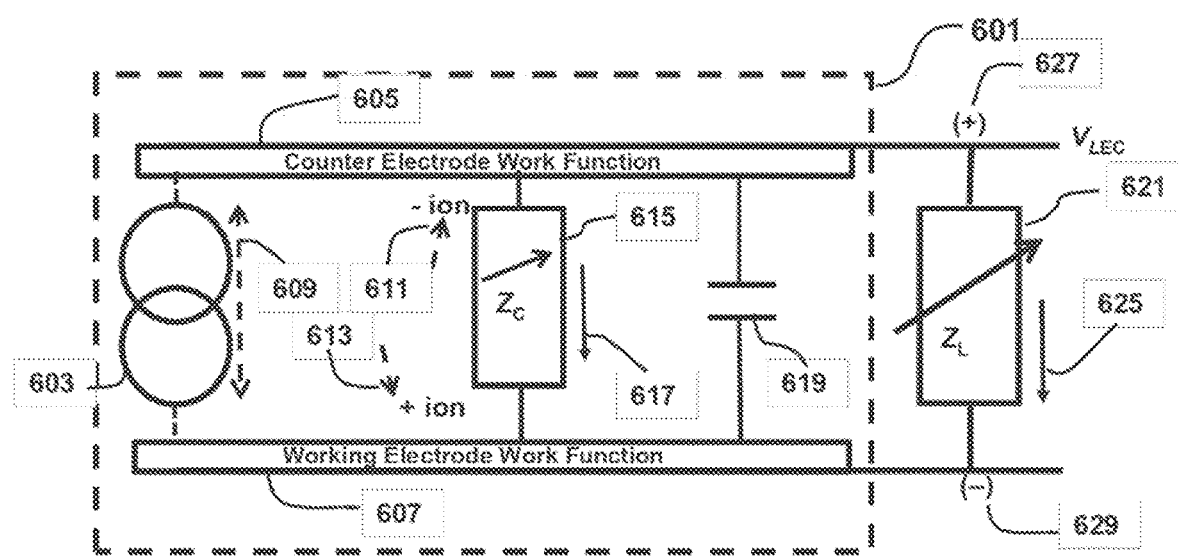
FIG. 6 is a phenomenological Norton equivalent circuit representation of the radiation flux processes within the LEC cell based on observed experimental data.

FIG. 6 shows a combined phenomenological model and physical electrical equivalent circuit representation of a LEC cell 601 based on the Norton equivalent circuit for a linear two-terminal electrical circuit. The approximately constant electrical current shown in FIG. 5 is modeled by a current source 603 where the magnitude of the ionizing radiation induced current 609 could be due to the direct charge and/or the diffusion of gaseous ions and may be designated $I_{Radiation}$. The shunting of the load current is represented as a variable voltage shunt impedance, $Z_C$ 615, in parallel with the variable load impedance $Z_L$ 621 and is likely due to the drift of ions produced by the ionizing radiation. The $I_{Shunt}$ current 617 that is shunted through shunt impedance $Z_C$ 615 may be designated as $I_{Shunt}$ (i.e., the internal shunt current of the cell 601). The $C_{Cell}$ physical capacitance 619 of the LEC cell configuration is represented as a shunt capacitance also in parallel with the load impedance $Z_t$ 621. The load current 625 may be designated as $I_{Load}$ which satisfies the condition that the direct current (DC) component of the load current is $I_{Load} = I_{Radiation} - I_{Shunt}$.

The possibility that the working electrode and the counter electrode could have different electrical properties or work functions is shown in the schematic by the thickened electrical conductors labeled Working Electrode Work Function 607 and Counter Electrode Work Function 605. The polarity of the LEC voltage may be either positive (+) or negative (−) but is shown for the counter electrode as "+" 627 and for the working electrode as "−" 629 for the direction of the current shown. The polarity would be reversed if the source of the $I_{Radiation}$ is caused by the diffusion of negative ions. The positive gas ions 613 and negative gas ions 611 drift between the electrodes under the influence of the electric field strength determined by the LEC voltage, physical separation of the electrodes, as well as the space charge in the gas due the presence of the ions. Although not explicitly shown in the equivalent circuit, the radiation current 609, $I_{Radiation}$ is shown to be a function of Kelvin temperature, $T_K$, since the spontaneous LEC currents were measured to be different at different cell temperatures as shown in FIG. 5.

Figure 7:
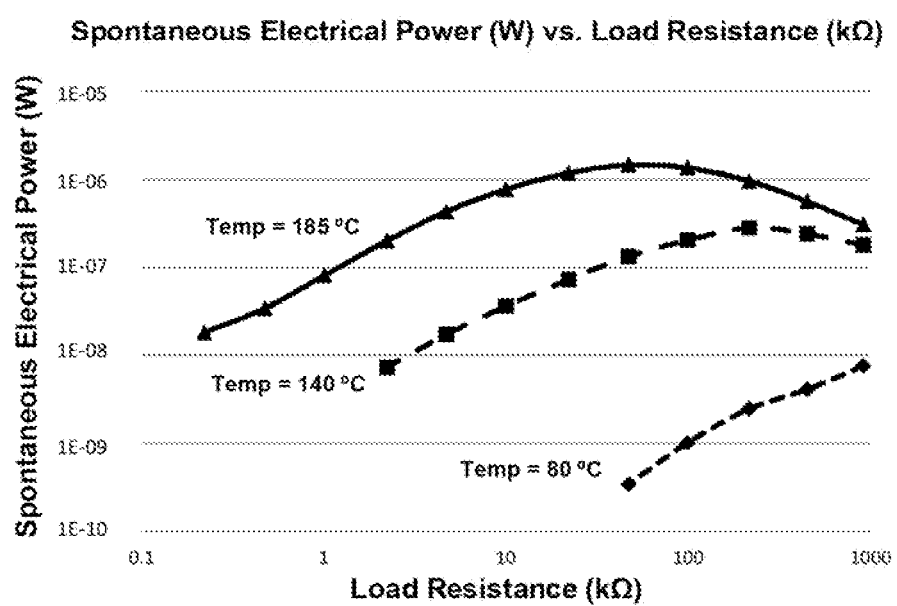
FIG. 7 shows spontaneous LEC power versus load resistance for three LEC cell temperatures.

FIG. 7 is a plot of the spontaneous electrical power versus load resistance at three temperatures that is calculated from the data shown in FIG. 5. It may be noted that the power is the greater at higher temperatures. What is more, there is an optimal load impedance to maximize the power which occurs before the internal shunt current term dominates the conduction.

Figure 8:
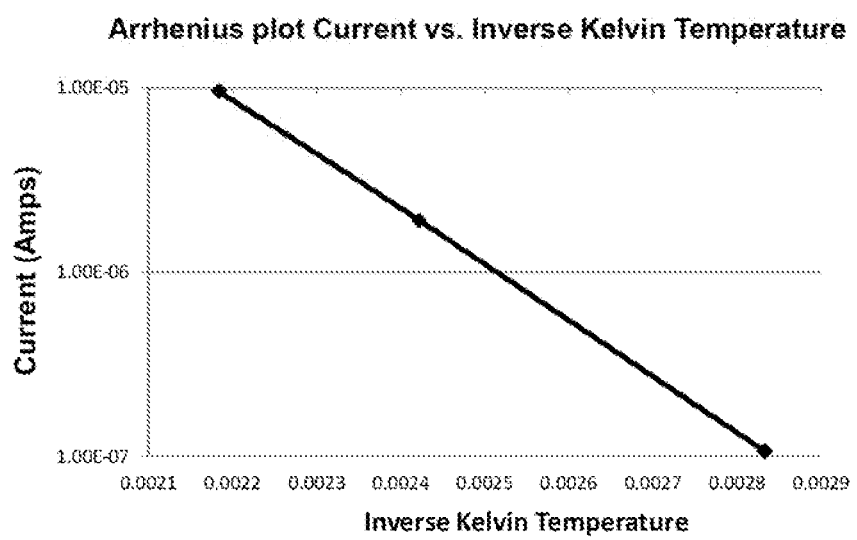
FIG. 8 is an Arrhenius plot of the natural log of current as a function of inverse Kelvin temperature.

FIG. 8 shows an Arrhenius plot of the data from FIG. 5 wherein the logarithm of the maximum current at the three temperatures is the ordinate axis versus reciprocal (inverse) cell temperature in Kelvin as the abscissa axis. The slope of the line is determined by the activation energy in eV divided by Boltzmann's constant in eV per Kelvin. The approximately straight line plot for higher temperatures between 80° C. and 185° C. (1/K=0.002833 and 0.002183) indicate that the current and thus the radiation flux are approximately exponential with inverse Kelvin temperature. It is also important to note that for most metals, the number of vacancies including superabundant vacancies increase exponentially to the inverse of the Kelvin temperature. This behavior strongly supports the importance of specially prepared hydrogen host lattice material procedures such as codeposition and other known processes that produce vacancies including super-abundant vacancies to establish a high initial number of vacancies which will further increase approximately exponentially with inverse temperature.

Figure 9:
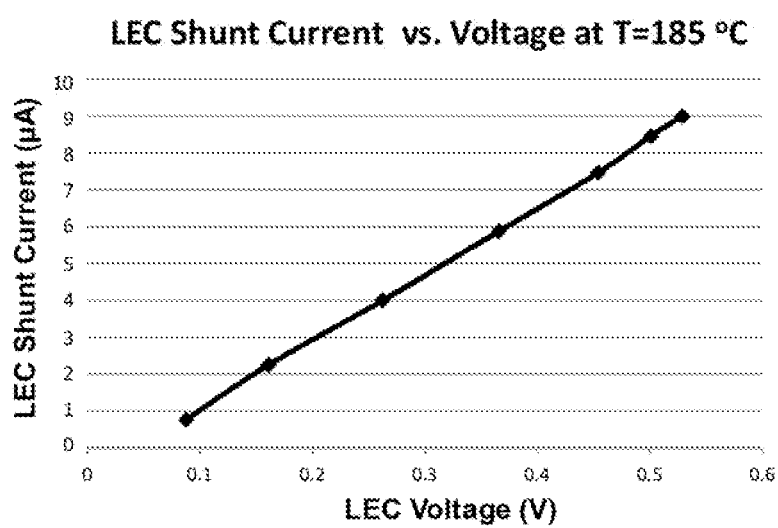
FIG. 9 is a plot of the shunt component of cell current versus cell voltage for a LEC cell at 185° C.

FIG. 9 is a plot of the shunt current versus LEC voltage for a temperature of 185° C. as shown in FIG. 5. Sir J. J. Thomson predicted that the current in a gas should initially increase linearly with voltage. Subsequently, K. K. Darrow showed that the current and voltage would not go to zero simultaneously due to the diffusion of the ions in the gas at low voltage. Both of these predictions are displayed in this plot.

Figure 10:
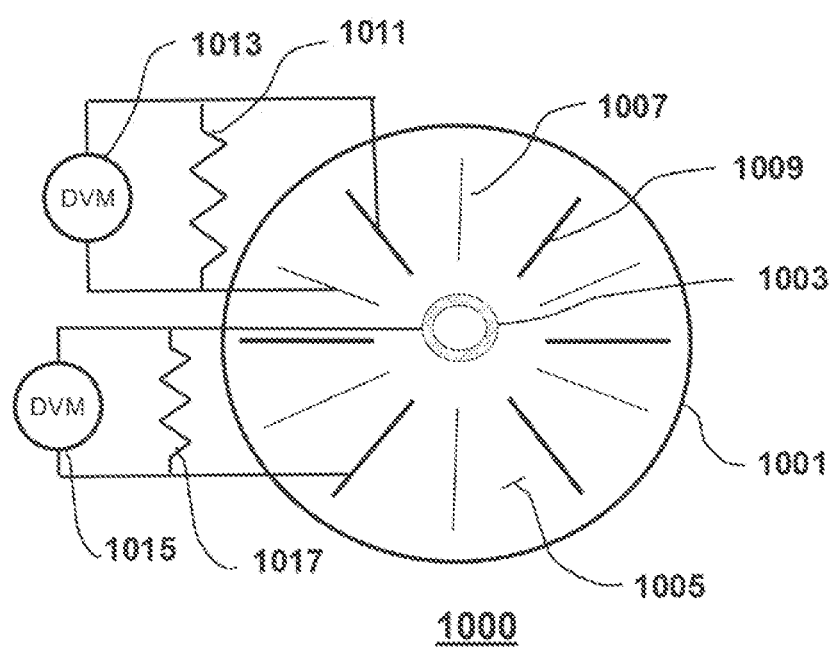
FIG. 10 is a cross-section view of a LEC cell for collecting gaseous ions via the Volta or contact potential difference (CPD) method using electrodes of different materials that may have different work functions and digital volt meters to measure the voltages.

FIG. 10 is a simplified cross-section view of an experimental LEC cell 1000 that includes alternating counter electrodes of Cu 1009 and Zn 1007 which have different work functions. The active working electrode 1003 is positioned at the center of the vessel 1001, and deuterium gas 1005 at approximately ambient pressure fills the vessel. The vessel 1001 for this cell 1000 is a glass jar which was selected to provide a longer ionization path distance between the ionization source of the working electrode 1003 and the fin-shaped electrodes 1009 and 1007 in order to exploit the ion diffusion, the Volta potential or contact potential difference phenomena, and to position the fin electrodes where most of the ionization occurs. Two sizes of glass jar vessels have been used; one allowing a 3% inch max diameter fin electrode configuration and the other with a wide mouth that allows about a 4 inch diameter fin electrode configuration. Several multiple-fin cell designs have been constructed and tested including six Cu fins 1009 and six Zn fins 1007 in alternating positions and also with two longer adjacent Cu fins alternating with two longer adjacent Zn fins. With the Cu fins connected together and the Zn fins connected together, the voltage is measured with a DVM 1013 connected between the Cu and Zn fin structures with a variable load resistor 1011 connected in parallel with the DVM. Another DVM 1015 is connected between the Cu fin structure 1009 and the active working electrode 1003 with a 5 MΩ load resistance 1017 connected in parallel with the DVM.

Figure 11:
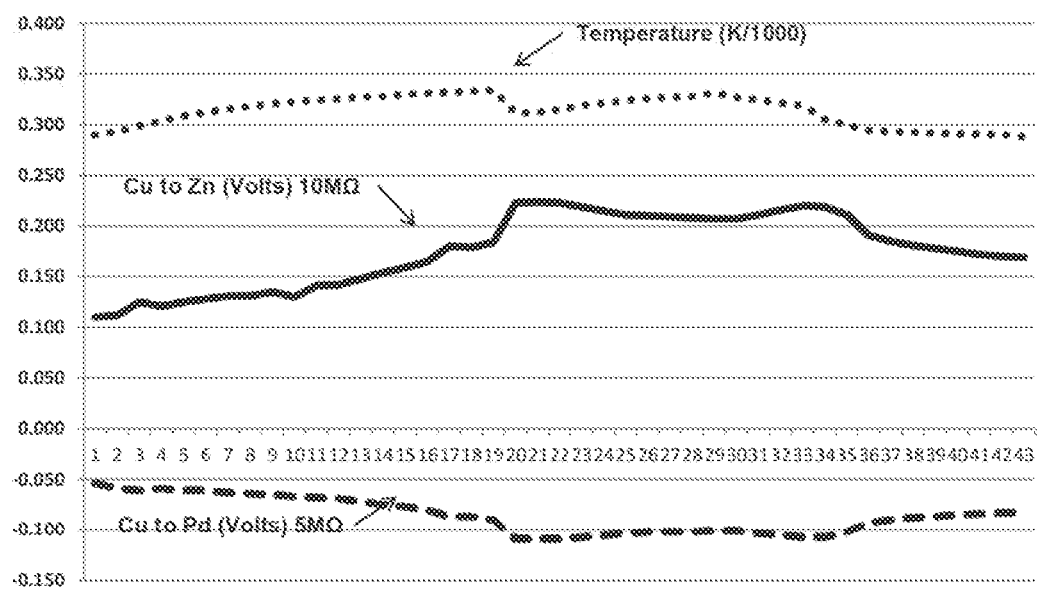
FIG. 11 shows plots of the LEC voltages between fin shaped electrodes and the active electrode in a LEC cell configured as shown in FIG. 10 as a function of Kelvin temperature.

FIG. 11 is a plot of data from the LEC fin cell 1000 of FIG. 10 which shows the cell temperature and the voltages measured between the Cu fins to the specially prepared codeposited Pd—H working electrode filled with deuterium gas. The Volta voltage or contact potential difference voltage is measured between the Cu and Zn fin structures. These results clearly show the presence of ion diffusion, or Volta or contact potential difference phenomena. Also, the voltage produced between the fin structures is a result of the ionized gas between the fins. A physical connection, such as a wire, between the fins and the working electrode is not required for a voltage and/or a current to be produced between the fin electrodes. Multiple experiments have demonstrated that the active working electrode will produce ionizing radiation without a physical connection to the other LEC cell electrodes, to ground, or to an external power supply.

Figure 12:
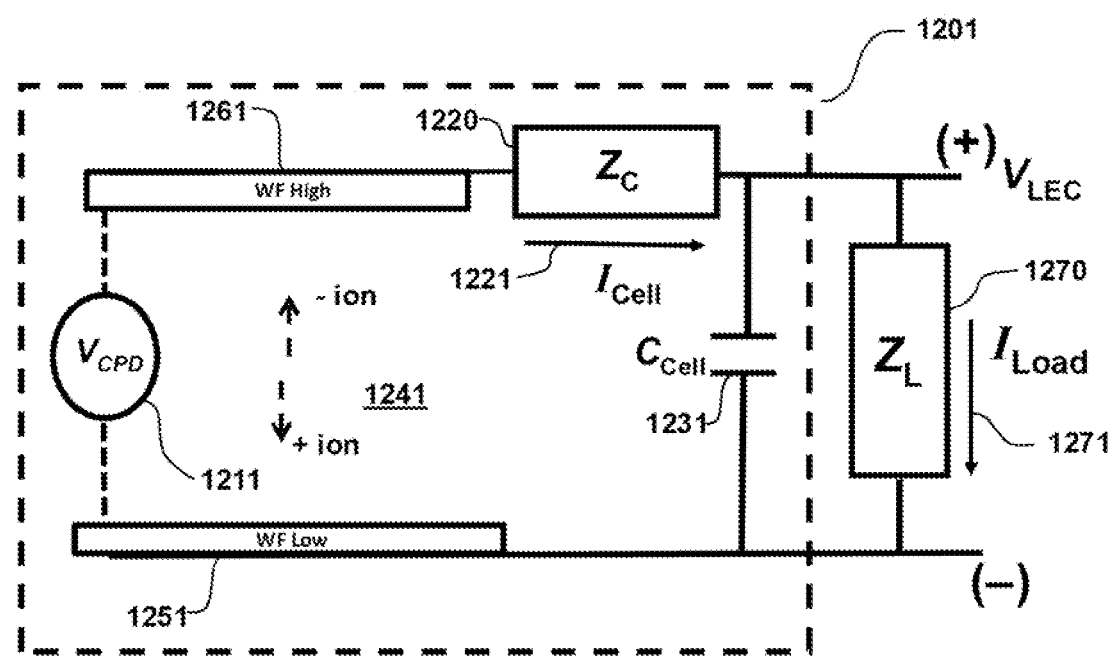
FIG. 12 is a phenomenological Thévenin equivalent circuit representation of the processes within a contact potential difference LEC cell based on observed experimental data.

FIG. 12 shows a combined phenomenological physical and electrical LEC cell diagram 1201 represented by a Thévenin equivalent circuit of a two-terminal electrical device. For this cell's equivalent circuit 1201, $V_{ContactPotentialDifference}$ or Volta potential 1211 and the internal cell impedance $Z_C$ 1220 represent the two-terminal electrical processes between the fins. The contact potential difference due to the dissimilar work functions of the finned electrodes 1251 and 1261 is represented by the Thévenin voltage source $V_{CPD}$ 1211. The capacitance of the cell 1201 is represented by $C_{Cell}$ 1231. The Thévenin internal cell impedance is represented by $Z_C$ 1220, and the cell current is represented by $I_{Cell}$ 1221 which connect the voltage source 1211 to the external load impedance $Z_L$ 1270. Thus, to maximize power, the external load impedance $Z_L$ 1270 should be equal to the internal cell impedance $Z_C$ 1220. The voltage source $V_{CPD}$ 1211 is approximately equal to the difference in the work functions of the electrodes 1251 and 1261 but diminished by the output voltage $V_{LEC}$. The amount of current, $I_{Load}$ 1271, that the cell 1201 can deliver to the external load impedance $Z_L$ 1270 depends upon a combination of the number of ions in the ion-ion plasma 1241, the electric field within the gas produced by the diffusion of the ions or the different work functions, the surface area of the fin electrode structure, the effective separation between the fins, and the magnitude of the load impedance Z 1270.

Figure 13:
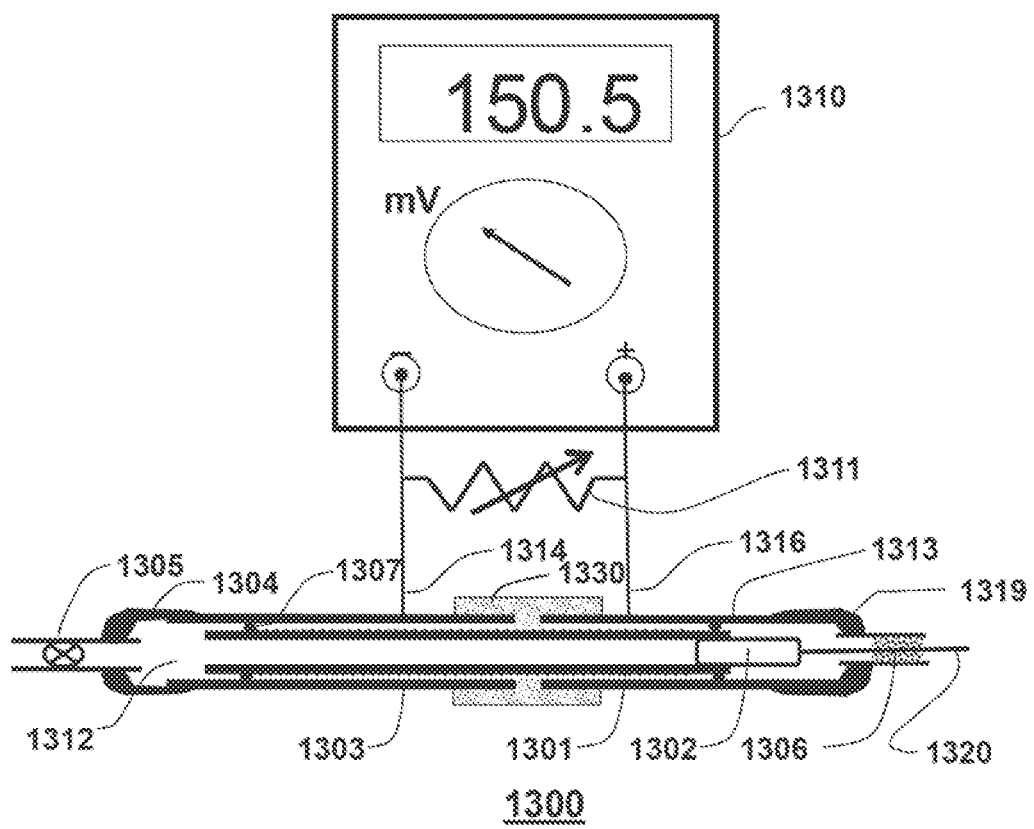
FIG. 13 illustrates a coaxial LEC cell with physically separated counter electrodes insulated from each other and connected to a digital volt meter with input impedance of approximately 10 MΩ but without any physical electrical connections to the working electrode.

FIG. 13 illustrates the ability of a LEC cell 1300 to produce a voltage between two counter electrodes 1303 and 1313 that are separated by an electrically insulating coupling 1330 where the working electrode 1301 is positioned midway between the counter electrodes and not physically connected to the counter electrodes or to ground. A bushing 1304 connects one counter electrode 1303 to a valve 1305 to allow for the evacuation of the LEC cell and its refilling with hydrogen gas 1312. The working electrode 1301 is positioned, and is separated by loose fitting O rings 1307, within the counter electrodes 1303 and 1313. The working electrode is attached to a threaded set screw 1302 which is connected to a wire 1320 that passes through a bushing 1319 that includes an electrically insulating material 1306 to provide a gas seal. A digital volt meter 1310 displays the voltage produced when connected by wires 1314 and 1316 between the two counter electrodes 1303 and 1313. A variable load resistor 1311 is connected between the wires 1314 and 1316 in order to characterize the performance of the cell 1300. As shown, the cell produced a self-sustained voltage of 150.5 mV after initial cell assembly. After several months of continuous operation through a 10 MΩ load, it was found that the LEC cell 1300 continued to produce approximately 125 mV. This cell embodiment illustrates the design and implementation flexibility for LEC devices.

Figure 14:
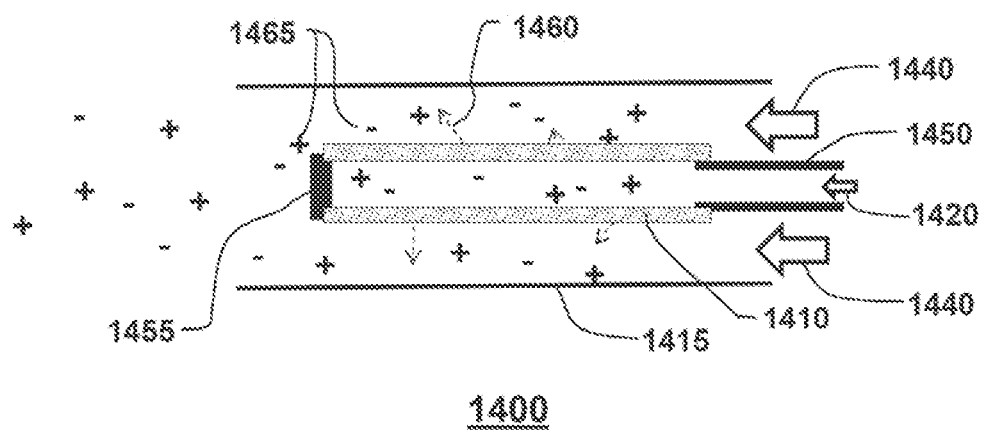
FIG. 14 illustrates an alternate cell embodiment that includes ionized gas flowing out of the LEC for some applications.

FIG. 14 illustrates an embodiment for a LEC cell 1400 to ionize a gas 1440 that is flowing between the specially prepared working electrode 1410 and a counter electrode 1415. This working electrode 1410 was prepared with a hydrogen host material lattice structure that is configured in the form of a tube. The tube 1410 in this embodiment consists of a woven wire mesh screen with a 0.075 mm hole size and 80 μm wire diameter super fine 304L stainless steel allowing a 34% open area that is rolled around and epoxied to a ⅛ inch brass pipe nipple 1450 at one end and a plug 1455 at the other end. The stainless steel wire mesh is initially plated with a nickel flash using a commercial Watts plating solution and then codeposited with palladium from an aqueous solution as previously described. The buildup of codeposited Pd—H will fill small openings in the screen to produce a solid layer of Pd—H on the outer surface of the tube.

When a gas or vapor 1420 containing hydrogen or deuterium flows into the tube 1410, the hydrogen or deuterium diffuses into the specially prepared working electrode hydrogen host material from the inside so that, as the hydrogen host material becomes occluded, it produces ionizing radiation 1460. As the hydrogen diffuses through the hydrogen host material to the outer surface, ionizing radiation 1460 is produced which produces ions 1465 in the gas 1440. The gas 1440 to be ionized, which may be a mixture of gases that are selected for the specific application, flows between the working electrode 1410 and the counter electrode 1415 where the ionizing radiation 1460 ionizes the gas 1440 and produces positive and negative ions 1465. The ionized gas 1440 exits the cell and can be used for applications such as medical applications, killing bacteria, sterilizing surfaces that may have bacteria, and for food irradiation to improve the safety and extend the shelf life of foods by reducing or eliminating microorganisms and insects.

Figure 15:
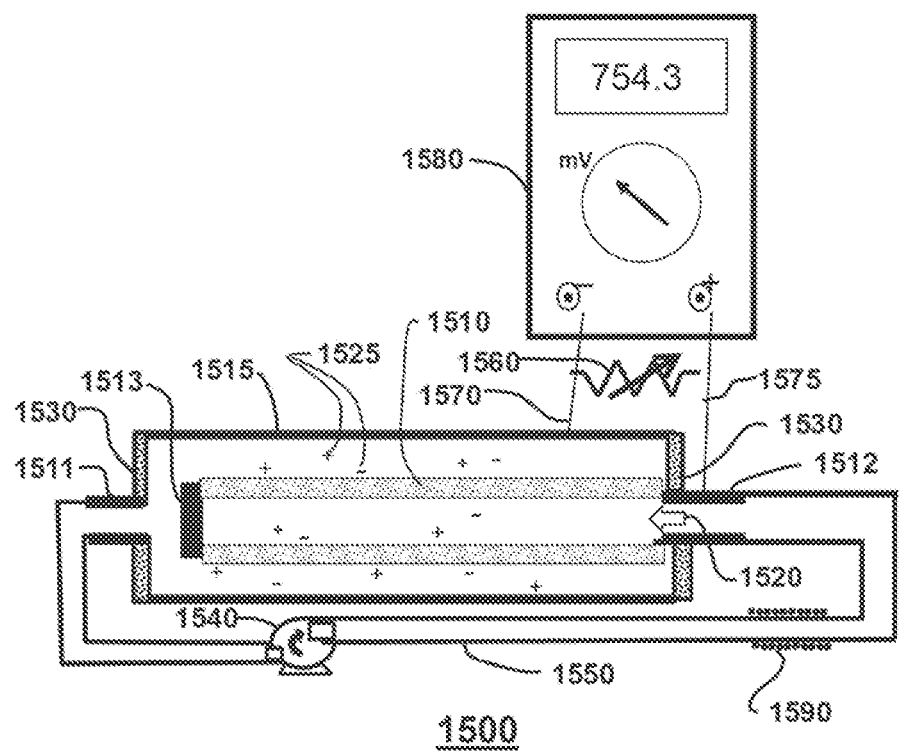
FIG. 15 illustrates a LEC cell embodiment wherein gas or vapor containing hydrogen is recirculated through a tube of palladium hydrogen host material.

FIG. 15 illustrates an alternative embodiment of a LEC cell 1500 designed to take advantage of an increase in the permeability of palladium by hydrogen of approximately 2 orders of magnitude when a combination of increased temperature and circulation of hydrogen is used. ("The Diffusion of Hydrogen through—Palladium" A. S. Darling, Platinum Metals Rev., 1958, 2, (1), 16-22) The working electrode 1510 is similar to the working electrode 1410 shown in FIG. 14 and includes a plug 1513 at one end and a ⅛ inch by 1 inch pipe nipple 1512 at the other end. The counter electrode 1515 is a ¾ inch pipe nipple approximately 5 inches long. Electrically insulating bushings 1530 provide a gas seal between the counter electrode 1515 and the ⅛ inch by 1 inch pipe nipple 1512 at one end that is attached to the working electrode 1510 and to a ⅛ inch by 1 inch pipe nipple 1511 at the other end of the counter electrode 1515. Hydrogen gas 1520 is pumped or blown into the interior of the working electrode 1510 through the nipple 1512 where it diffuses into, is occluded in the palladium, and produces ionizing radiation and ions 1525 in the space between the working electrode 1510 and the counter electrode 1515. Tubing and fittings 1550 and a pump or blower 1540 and the nipples 1511 and 1512 provide a means to recirculate the hydrogen gas 1520. An optional heater 1590 provides a source of heat to heat the hydrogen gas. Ionizing radiation is produced by the working electrode 1510 to provide a voltage and current between the working electrode 1510 and the counter electrode 1515. This voltage is measured by a digital volt meter 1580 connected by respective conductors 1570 and 1575 to the counter electrode 1515 and the working electrode 1510 via the nipple 1512 in parallel with a variable load resistor 1560.

Figure 16:
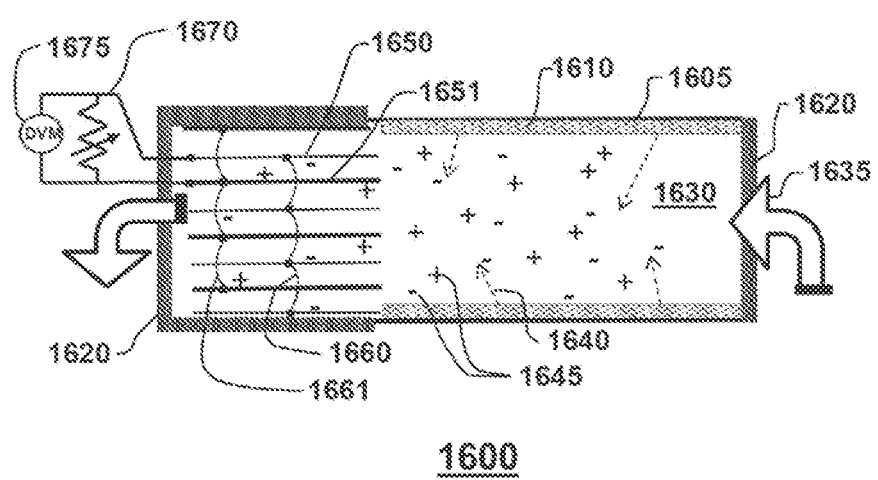
FIG. 16 illustrates a LEC cell embodiment wherein ionized gas flows past a counter electrode structure to capture the ions.

FIG. 16 illustrates a cross-section view of a rectangular box shaped LEC device 1600 including a vessel comprised in part of non-conducting non-permeable material 1620 and in part of an electrically conductive hydrogen non-permeable barrier material 1605 that has been codeposited on the inside with hydrogen host material 1610 to form the working electrodes. Additional working electrodes and one or more optional counter electrodes, not shown, may be installed between the working electrodes 1610 to increase the number of ions produced. For this embodiment, the gas 1630 containing hydrogen is introduced through a port 1635 in the non-conducting material 1620 at the end of the cell 1600 where the working electrode hydrogen host material 1610 produces ionizing radiation 1640 to produce ions 1645 in the gas 1630. The ionized gas flows between the fins of an electrode structure which is comprised of interdigitated electrodes 1650 and 1651. Alternating electrodes 1650 and 1651 may have different work functions and are electrically connected together by wires 1660 and 1661. As the ionized gas flows between the interdigitated electrodes, the positive and negative ions in the gas are preferentially attracted to the electrodes where the ions deposit their charge, producing a voltage across and a current through an external load 1670 that is measured by a digital volt meter 1675. The gas 1630 is recirculated via an external loop (not shown) and reintroduced through a port 1635 into the cell 1600.

Figure 17:
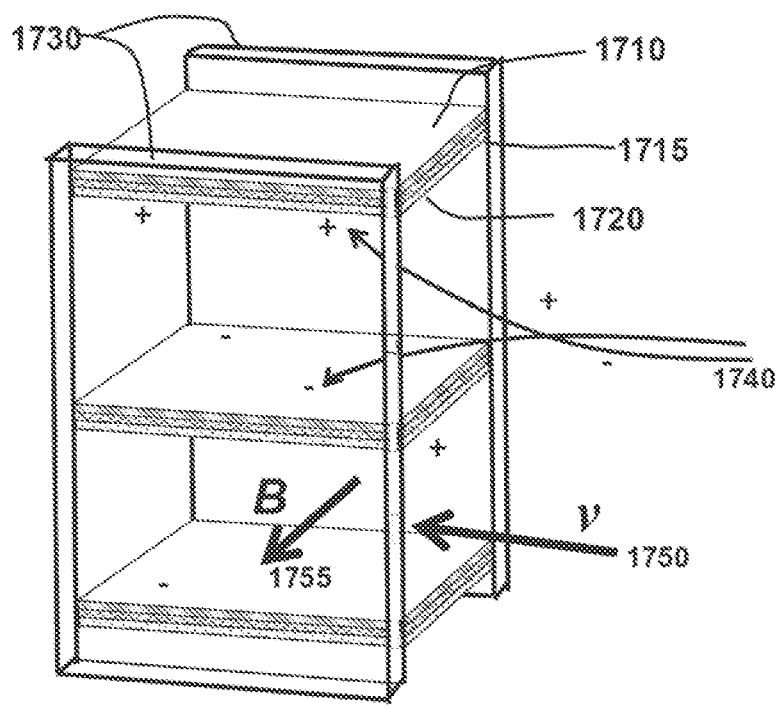
FIG. 17 illustrates an alternate counter electrode structure to that shown in FIG. 16 and including a magnetic field.

FIG. 17 illustrates an alternate electrode configuration to that shown in FIG. 16 having one or more electrode structures comprised of two foils or sheets 1710 and 1720 of conductive metal such as copper or zinc with an electrically insulating material 1715 located between them. Several of these electrode structures can be used to replace the electrodes illustrated in FIG. 16. A magnetic field, B 1755 is created, such as by two magnets 1730, that is orthogonal to the direction of the gas containing ions 1740 that is flowing with velocity v 1750 between the electrode structures. As shown, the magnetic field B 1755 creates a v×B force wherein positive ions go up and negative ions go down and where the ions are collected by the respective electrodes. Multiple electrodes 1710 and 1720 are electrically connected together, not shown, and connected to an external load with the voltage measured with a digital volt meter, not shown. In the presence of the magnetic field B 1755 as shown, the electrodes 1710 and 1720 do not need to have different work functions.

Figure 18:
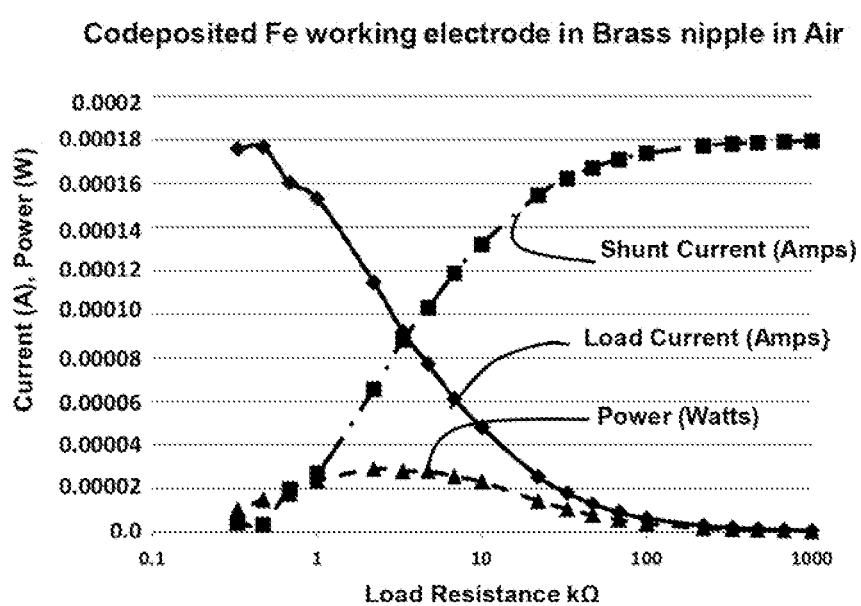
FIG. 18 shows a plot of cell Currents versus Load Resistance for a self-sustaining LEC cell with codeposited iron as the working electrode hydrogen host material.

FIG. 18 is a plot of the load current, shunt current, and power in a load resistance versus the logarithm of load resistance for the LEC cell 100 shown in FIG. 1 with the exception that the hydrogen host material is now codeposited iron from an aqueous solution of $FeCl_2 \cdot 4H_2O$ rather than palladium, and the gas in the cell is now air at atmospheric pressure which only contains approximately 0.5 parts per million of hydrogen. For this embodiment, a ⅛ in by 4 inch "black iron" pipe nipple is cleaned to remove any protective coating and placed as the cathode in a plating bath consisting of 0.1 molar $FeCl_2 \cdot 4H_2O$ in an aqueous solution at room temperature. A platinum anode is used for the codeposition process.

In this embodiment, codeposition of the iron started for 30 minutes at a current of approximately 50 $\mu A/cm^2$ which was then increased to approximately 100 $\mu A/cm^2$ for an additional approximately 30 minutes. The current was then increased to approximately 2 $mA/cm^2$ for times ranging from 4 hours to one day. The working electrode was then removed from the plating bath and the aqueous plating bath was allowed to drip off before the working electrode was inserted it into a ¾ inch brass pipe nipple counter electrode, making sure that the working electrode is not in physical or direct electrical contact with the counter electrode. The data plotted in FIG. 18 was recorded using a digital volt meter having a 10 MΩ internal impedance in parallel with a resistor box with 24 resistance settings between 1 MΩ and 10Ω. The plot of FIG. 18 shows characteristics similar to the characteristics of a codeposited palladium-hydrogen host material plotted in FIG. 5. The working electrode also can be placed into a cell such as that described in FIG. 1 where the gas is hydrogen rather than air. The use of iron or alloys of iron as the hydrogen host material has significant cost and availability benefits over the use of other materials such as palladium. In addition, the use of air rather than hydrogen gas may be beneficial for some applications.

Figure 19:
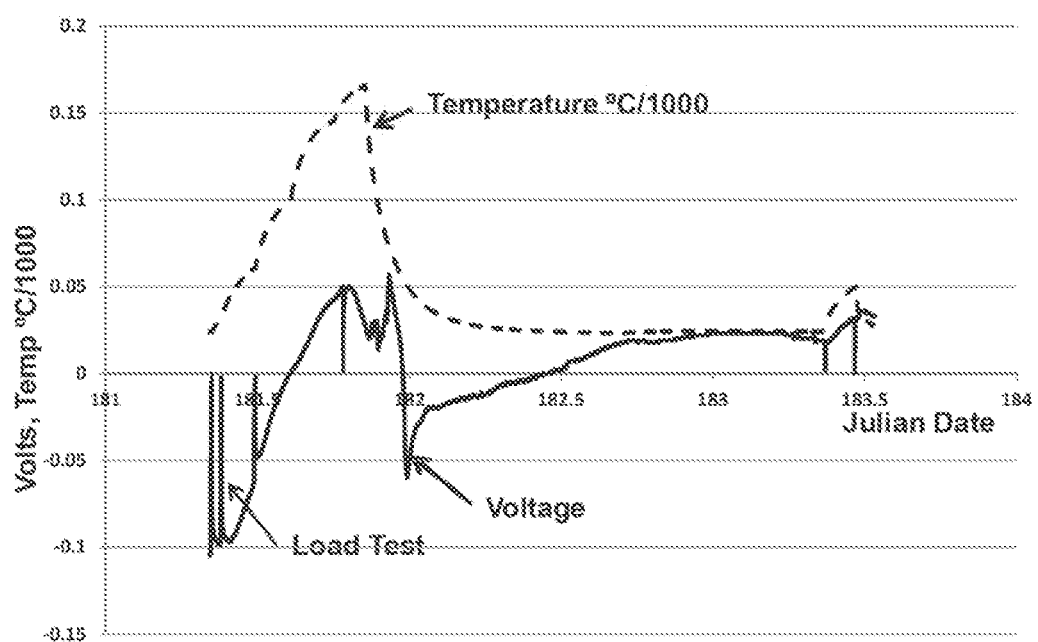
FIG. 19 shows a plot of a self-sustaining LEC cell reversing polarity over time and temperature.

FIG. 19 is a plot of a self-sustaining LEC cell 100 as shown in in FIG. 1 that reversed polarity three times over a time period of four days that included times when the cell was thermally cycled from approximately 24° C. to as high as 165° C. and times where the current changed when the temperature was relatively constant at room temperature. As shown, the voltage was initially approximately −0.1 volts at 24° C. and increased to approximately +0.05 volts as the temperature in the LEC cell increased to 165° C. When the temperature in the LEC cell cooled to 24° C., the voltage remained slightly positive but then dropped to −0.06 volts. From there, it gradually increased to +0.02 volts while the temperature remained at 24° C. On the third day, a short temperature increase caused the voltage to increase from approximately +0.02 to +0.04 volts at which time the temperature began to cool.

As shown, six load tests were conducted during this time. The resulting cell behavior illustrates the multiple complex phenomena that may be involved in the production of ionizing radiation, ions, and electricity. In addition to temperature, other possible phenomena that could contribute to this behavior include a change in the work functions of the electrodes due to changes in the surfaces as a result of hydrogen loading and reloading, ions impacting the electrodes, and non-linear processes. ("Chemical and structural components of work function changes in the process of palladium hydride formation within thin Pd film," R. Dus, R. Nowakowski, E. Nowicka, Journal of Alloys and Compounds Volumes 404-406, 8 Dec. 2005, Pages 284-287).

The invention claimed is:

1. A lattice energy conversion device to convert energy in a material having a lattice structure into ionizing radiation, said lattice energy conversion device comprising;
   a gas containing hydrogen; and
   at least one working electrode being formed from a hydrogen host material, said hydrogen host material lying in fluidic contact with said gas, said hydrogen host material having a lattice structure, the lattice structure of said hydrogen host material being occluded with the hydrogen from said gas, such that energy in the lattice structure of the hydrogen host material of said at least one working electrode and the hydrogen with which said lattice structure is occluded produces ionizing radiation.

2. The lattice energy conversion device of claim 1, wherein the hydrogen host material of said at least one working electrode is comprised of at least one of a bulk or a particulate material.

3. The lattice energy conversion device of claim 1, further comprising a vessel in which to confine the gas, said vessel maintaining said gas in said fluidic contact with the hydrogen host material of said at least one working electrode, said vessel including at least one port and at least one valve that communicates with said at least one port by which to control the pressure of the gas confined by said vessel and thereby control the flux of the ionizing radiation.

4. The lattice energy conversion device of claim 3, wherein said vessel is comprised in whole or in part from said hydrogen host material.

5. The lattice energy conversion device of claim 1, further comprising a source of heat to apply heat to and thereby increase the energy in the lattice structure of the hydrogen host material and in the hydrogen with which said hydrogen host material is occluded.

6. The lattice energy conversion device of claim 1, further comprising a magnetic field generator to produce a magnetic field, said at least one working electrode lying in said magnetic field by which to control the energy in the lattice structure of the hydrogen host material of said at least one working electrode and in the hydrogen with which said hydrogen host material is occluded.

7. The lattice energy conversion device of claim 1, further comprising an electric field generator to produce an electric field, at least one of said at least one working electrode or said gas lying in said electric field by which to control the flux of the ionizing radiation and ions of said ionizing radiation.

8. The lattice energy conversion device of claim 1, wherein the hydrogen host material of said at least one working electrode is formed from one of palladium or an alloy of palladium.

9. The lattice energy conversion device of claim 1, wherein the hydrogen host material of said at least one working electrode is formed from one of nickel or an alloy of nickel.

10. The lattice energy conversion device of claim 1, wherein the hydrogen host material of said at least one working electrode is formed from one of iron or an alloy of nickel.

11. The lattice energy conversion device of claim 1, wherein the hydrogen host material of said at least one working electrode is an electrodeposition formed from an aqueous plating solution.

12. A lattice energy conversion device to convert energy in a material having a lattice structure into at least one of a voltage or a current, said lattice energy conversion device comprising:
a gas containing hydrogen;
at least one working electrode being formed from a hydrogen host material, said hydrogen host material lying in fluidic contact with said gas, said hydrogen host material having a lattice structure, the lattice structure of said hydrogen host material being occluded with the hydrogen from said gas, such that energy in the lattice structure of the hydrogen host material of said at least one working electrode and the hydrogen with which said lattice structure is occluded produce ionizing radiation, said ionizing radiation ionizing the gas that lies in said fluidic contact with the hydrogen host material of said at least one working electrode; and
at least one counter electrode being physically separated from said at least one working electrode, said at least one counter electrode lying in fluidic contact with the ionizing radiation and with the gas that is ionized by said ionizing radiation so that at least one of a voltage is produced across or a current is generated through an electrical load impedance that is connected between said at least one working electrode and said at least one counter electrode.

13. The lattice energy conversion device of claim 12, further comprising a vessel in which to contain each of the hydrogen host material of said at least one working electrode and said at least one counter electrode, said vessel confining the gas such that said gas lies in said fluidic contact with the hydrogen host material of said at least one working electrode and in fluid contact with said at least one counter electrode, wherein said vessel includes at least one port and at least one valve that communicates with said at least one port by which to control the pressure of the gas confined by said vessel to control the flux of the ionizing radiation and ions of said ionizing radiation whereby at least one of said voltage is produced across or said current is generated through the electrical load impedance.

14. The lattice energy conversion device of claim 13, wherein said vessel is comprised in whole or in part of said at least one counter electrode.

15. The lattice energy conversion device of claim 13, wherein said vessel is comprised in whole or in part of the hydrogen host material from which said at least one working electrode is formed.

16. The lattice energy conversion device of claim 12, wherein said counter electrode is comprised of a voltaic material that is adapted to collect energy from the ionizing radiation produced by said at least one working electrode.

17. A lattice energy conversion device to convert energy in a material having a lattice structure into at least one of a voltage or a current, said lattice energy conversion device comprising:
a gas containing hydrogen;
at least one working electrode being formed from a hydrogen host material, said hydrogen host material lying in fluidic contact with said gas, said hydrogen host material having a lattice structure, the lattice structure of said hydrogen host material being occluded with the hydrogen from said gas, such that energy in the lattice structure of the hydrogen host material and the hydrogen with which said lattice structure is occluded produce ionizing radiation, said ionizing radiation ionizing the gas that lies in said fluidic contact with the hydrogen host material of said at least one working electrode; and
at least two counter electrodes being physically separated from each other and from said at least one working electrode, said at least two counter electrodes lying in fluidic contact with the gas ionized by said ionizing radiation, said at least two counter electrodes producing at least one of a voltage between said at least two counter electrodes or a current through an electrical load impedance that is connected between said at least two counter electrodes.

18. The lattice energy conversion device of claim 17, wherein the hydrogen host material of said at least one working electrode is formed from one of a bulk or a particulate material.

19. The lattice energy conversion device of claim 17, further comprising a vessel in which to contain each of the hydrogen host material of said at least one working electrode and said at least two counter electrodes, said vessel confining the gas such that said gas lies in said fluidic contact with the hydrogen host material of said at least one working electrode and in fluid contact with said at least two counter electrodes, wherein said vessel includes at least one port and at least one valve that communicates with said at least one port by which to control the pressure of the gas confined by said vessel to thereby control the flux of the ionizing radiation or ions of said ionizing radiation.

20. The lattice energy conversion device of claim 17, wherein said at least two counter electrodes lie within a magnetic field by which to alter the motion of the said ionized gas, ionized by said ionizing radiation, when said ionized gas lies in said fluidic contact with said at least two counter electrodes.

* * * * *

UNITED STATES PATENT AND TRADEMARK OFFICE
CERTIFICATE OF CORRECTION

| | | |
|---|---|---|
| PATENT NO. | : 11,232,880 B2 | Page 1 of 1 |
| APPLICATION NO. | : 17/334562 | |
| DATED | : January 25, 2022 | |
| INVENTOR(S) | : Frank E. Gordon and Harper John Whitehouse | |

It is certified that error appears in the above-identified patent and that said Letters Patent is hereby corrected as shown below:

On the Title Page

Item (73) Assignee should read:
Inovl, Inc., San Diego, CA (US).

Signed and Sealed this
Fifteenth Day of November, 2022

Katherine Kelly Vidal
*Director of the United States Patent and Trademark Office*